United States Patent
Jin et al.

(10) Patent No.: US 9,503,790 B2
(45) Date of Patent: Nov. 22, 2016

(54) SORTING CONTENT ASSETS

(71) Applicant: Verizon and Redbox Digital Entertainment Services, LLC, Basking Ridge, NJ (US)

(72) Inventors: Zhiying Jin, Lexington, MA (US); Seldron D. Geziben, Wayland, MA (US)

(73) Assignee: Verizon and Redbox Digital Entertainment Services, LLC, Basking Ridge, NJ (US)

(*) Notice: Subject to any disclaimer, the term of this patent is extended or adjusted under 35 U.S.C. 154(b) by 115 days.

(21) Appl. No.: 14/142,023

(22) Filed: Dec. 27, 2013

(65) Prior Publication Data

US 2015/0189354 A1    Jul. 2, 2015

(51) Int. Cl.
*H04N 21/475* (2011.01)
*H04N 21/466* (2011.01)
*H04N 21/258* (2011.01)
*H04N 21/482* (2011.01)

(52) U.S. Cl.
CPC ...... *H04N 21/4758* (2013.01); *H04N 21/4662* (2013.01); *H04N 21/4756* (2013.01); *H04N 21/25891* (2013.01); *H04N 21/4828* (2013.01)

(58) Field of Classification Search
None
See application file for complete search history.

(56) References Cited

U.S. PATENT DOCUMENTS

| | | | |
|---|---|---|---|
| 7,293,275 B1* | 11/2007 | Krieger et al. | 725/40 |
| 2004/0117831 A1* | 6/2004 | Ellis et al. | 725/53 |
| 2005/0097606 A1* | 5/2005 | Scott et al. | 725/52 |
| 2006/0026647 A1* | 2/2006 | Potrebic et al. | 725/53 |
| 2007/0169148 A1* | 7/2007 | Oddo et al. | 725/46 |
| 2007/0250901 A1* | 10/2007 | McIntire et al. | 725/146 |
| 2008/0097835 A1* | 4/2008 | Weiser | 705/14 |
| 2008/0243733 A1* | 10/2008 | Black | 706/16 |
| 2009/0063543 A1* | 3/2009 | Martin et al. | 707/102 |
| 2010/0262995 A1* | 10/2010 | Woods et al. | 725/40 |
| 2011/0093329 A1* | 4/2011 | Bodor et al. | 705/14.42 |
| 2012/0054810 A1* | 3/2012 | Nijim | 725/93 |
| 2012/0078829 A1* | 3/2012 | Bodor et al. | 706/45 |
| 2012/0078830 A1* | 3/2012 | Bodor et al. | 706/46 |
| 2012/0151511 A1* | 6/2012 | Bernard et al. | 725/10 |
| 2014/0223480 A1* | 8/2014 | Berry et al. | 725/40 |
| 2014/0380359 A1* | 12/2014 | Musil | H04N 21/6582 725/34 |

* cited by examiner

*Primary Examiner* — Nasser Goodarzi
*Assistant Examiner* — Terrika Peterson

(57) ABSTRACT

A network device obtains a first number of stars associated with a fan rating of a first asset by a first user, and obtains a total first number of fan reviews of the first asset. The network device obtains a first release year associated with the first asset, and determines a first sorting value based on a function of the first number of stars, the total first number of reviews, and the first release year. The network device sorts the first asset among other assets using the determined first sorting value.

23 Claims, 13 Drawing Sheets

|  | STARS | FAN REVIEWS | RELEASE DATE | SORTING VALUE |
|---|---|---|---|---|
| ASSET A | **** | 5 | 1999 | 4,501,999 |
| ASSET B | ***** | 10 | 2013 | xx |
| ASSET C | ***** | 3 | 2010 | xx |
| ASSET D | ***** | 20 | 2012 | xx |
| ASSET E | **** | 15 | 1985 | 5,501,985 |
| ASSET F | **** | 5 | 2013 | 4,502,013 |
| ASSET G | **** | 10 | 1975 | xx |
| ASSET H | **** | 15 | 1975 | 5,501,975 |
| ASSET I | ***** | 15 | 2012 | xx |
| ASSET J | **** | 20 | 2011 | xx |
| ↑ | ↑ | ↑ | ↑ | ↑ |
| 900 | 905 | 910 | 915 | 920 |

|  | STARS | FAN REVIEWS | RELEASE DATE | SORTING VALUE |
|---|---|---|---|---|
| ASSET A | **** | 1 | 1999 | xx |
| ASSET B | ***** | 3 | 2013 | xx |
| ASSET C | ***** | 2 | 2010 | xx |
| ASSET D | ***** | 5 | 2012 | xx |
| ASSET E | **** | 10 | 1985 | xx |
| ASSET F | **** | 1 | 2013 | xx |
| ASSET G | **** | 2 | 1975 | 4,201,975 |
| ASSET H | **** | 2 | 1975 | 4,201,975 |
| ASSET I | ***** | 4 | 2012 | xx |
| ASSET J | **** | 10 | 2011 | xx |
|  ↑ | ↑ | ↑ | ↑ | ↑ |
| 1100 | 1105 | 1110 | 1115 | 1120 |

|  | STARS | FAN REVIEWS | RELEASE DATE | SORTING VALUE |
|---|---|---|---|---|
| ASSET A | **** | 1 | 1999 | xx |
| ASSET B | ***** | 3 | 2013 | xx |
| ASSET C | ***** | 2 | 2010 | xx |
| ASSET D | ***** | 5 | 2012 | xx |
| ASSET E | **** | 10 | 1985 | xx |
| ASSET F | **** | 1 | 2013 | xx |
| ASSET G | **** | 2 | 1975 | xx |
| ASSET H | **** | 2 | 1975 | xx |
| ASSET I | ***** | 4 | 2012 | xx |
| ASSET J | **** | 10 | 2011 | xx |
| 1300 | 1305 | 1310 | 1315 | 1320 |

SORTING CONTENT ASSETS

BACKGROUND

Hypertext Transfer Protocol (HTTP) Live Streaming (HLS) is a HTTP-based media streaming communications protocol that involves breaking the media stream into a sequence of file downloads. Each file may be downloaded as one portion of a transport stream. Each downloaded file may be played in sequence to present a continuous media stream. As a given stream is played, the client may choose from multiple different alternative streams containing the same content encoded at various data rates. At the beginning of a streaming session, the client downloads a playlist file that specifies the different or alternate streams that are available. In HLS, a given multimedia presentation is specified by a Uniform Resource Identifier (URI) to the playlist file, which itself consists of an ordered list of media URIs and informational tags. Each media URI refers to a media file that is a segment of a single continuous media stream. To play a stream, a client first obtains the playlist file and then obtains and plays each media file in the playlist in sequence.

Content assets such as, for example, video content assets (e.g., movies) may be streamed using HLS from a content delivery network (CDN) to a client device for playback of the sequence of HLS files at the client device. Users at the client devices may search the content assets hosted by the content delivery network to obtain lists of assets that are relevant to the expressed interests of the users. From those lists, the users may select a specific asset(s) that they desire to have streamed to their client device.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein implement processes for sorting content assets based on various different types of fan rating/fan review information. The processes described herein sort content assets, identified as results of content searches, based on fan rating/review information such as, for example, asset release date, cumulative number of fan rating stars for each asset, number of fan reviews for each asset, a most recent fan review date for each asset, and/or a sorting value assigned to each asset based on one or more functions. The sorting values may be determined using the one or more functions that may be conditionally applied based on the fan rating/review information for each asset. The content asset sorting processes, described herein, therefore sort content assets based on data other than, or in addition to, merely the number of fan rating stars applied by users to each asset. For example, processes described herein may additionally, or alternatively, use other fan rating/review information such as number of fan reviews for each content asset and/or a calculated sorting parameter for each asset.

Figure 1:
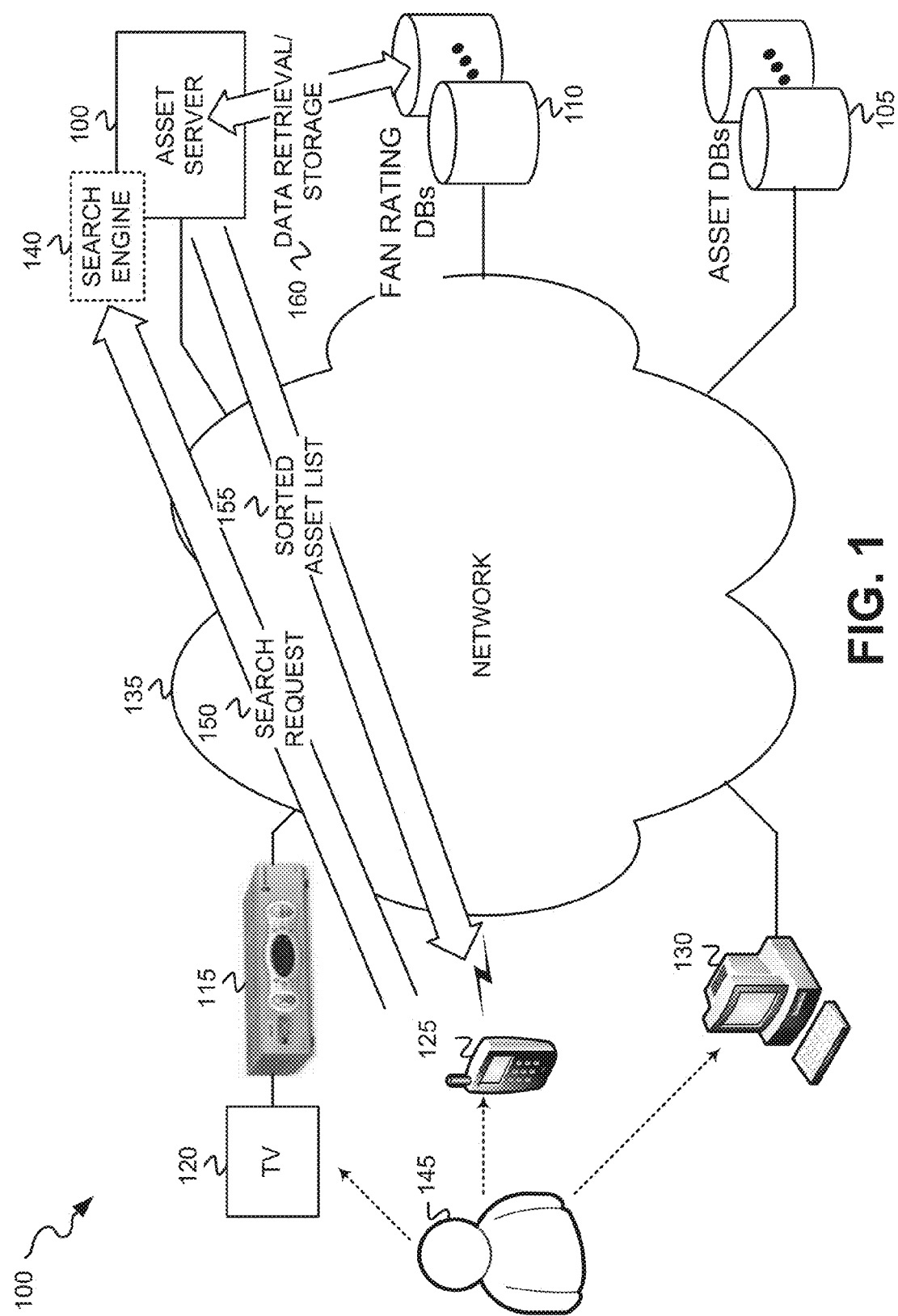
FIG. 1 is a diagram that depicts an exemplary network environment in which content assets are sorted, based on fan review or fan rating-related information, and provided to a user searching the content assets.

FIG. 1 depicts an exemplary network environment 100 in which content assets are sorted, based on fan review or fan rating-related information, and provided to a user searching the content assets. Network environment 100 may include a an asset server 100, one or more asset databases (DBs) 105, multiple fan rating DBs 110, a set-top box (STB) 115 and associated television (TV) 120, a mobile device 125, a computer 130, and a network 135.

Asset server 100 includes a network device that receives content asset search requests from users, and provides sorted lists of content assets that are relevant to the search requests and which are sorted as described herein. Asset server 100 may further retrieve and deliver one or more of the content assets from the sorted lists to requesting users via network 135. Asset server 100 may implement a search engine 140 that searches a corpus of content assets (e.g., stored in asset DBs 105), using a search algorithm, to identify a list of one or more content assets that are relevant to one or more search parameters contained in the search request. Asset server 100, using exemplary processes described herein, may further sort the identified list of relevant content assets before providing the sorted list of content assets to user 145 at either STB 115, mobile device 125 or computer 130.

Asset DBs 105 includes one or more network devices that store a data structure that further stores content assets and associated metadata. The content assets may include any type of digital content, such as, for example, image, video, or audio digital content. The video content may include, for example, movies or TV episodes. The audio content may include, for example, songs.

Fan rating DBs 110 includes one or more network devices that store multiple data structures that further store data related to fan reviews of content assets. Fan rating DBs 110 may include an individual fan ratings DB 110-1 (not depicted in FIG. 1, but shown in FIG. 4) that stores fan ratings data, and associated information, received from individual reviewing users. Individual fan ratings DB 110-1 is described in further detail with respect to FIG. 4 below. Fan rating DBs 110 may further include a cumulative asset fan ratings DB 110-2 (not depicted in FIG. 1, but shown in FIG. 5) that stores fan ratings for each content asset that are accumulated from multiple different users for multiple different reviews of each content asset. Cumulative asset fan ratings DB 110-2 is described in further detail with respect to FIG. 5 below.

STB 115 may include a network device that receives content assets, from asset server 100, over network 135 for presentation to user 145 via TV 120. STB 115 may, for example, receive the content assets via one or more channels (e.g., Quadrature Amplitude Module (QAM) channels, Internet Protocol (IP) streams, etc.) over network 135. The content may include, for example, video, audio or images. STB 115 may additionally execute an application (app) (not shown) that provides one or more user interfaces that enable user 145 to interact with asset server 100 to conduct content asset searches.

Mobile device 125 may include a portable electronic device having wireless communication capabilities that may communicate via network 135. Mobile device 125 may include, for example, a laptop, palmtop or tablet computer having wireless capability; a cellular telephone (e.g., a "smart" phone); or a personal digital assistant (PDA) having wireless capability. Computer 130 may include, for example, a desktop or laptop computer that connects to network 135 via wired connections.

STB 115, mobile device 125 and computer 130 may each execute a content player. The content player may present or "play" content assets received from asset server 100. For example, if the content assets include video content, the content player may include a video media player that plays back video data streamed from asset server 100.

Network 135 may include one or more networks of various types including, for example, a satellite network, a telecommunications network (e.g., a Public Switched Telephone Network (PSTN), Public Land Mobile Network (PLMN), a local area network (LAN), an Advanced Television Systems Committee (ATSC) standards-based network (e.g., over the air (OTA) network), a wide area network (WAN), a metropolitan area network (MAN), an intranet, the Internet, or a cable network (e.g., an optical cable network). The PLMN may include a Code Division Multiple Access (CDMA) 2000 PLMN, a Global System for Mobile Communications (GSM) PLMN, a Long Term Evolution (LTE) PLMN and/or other type of PLMN. Network 135 may, in some implementations, include QAM channels (or other types of modulated or broadcast channels) for delivering content assets and Electronic Program Guide (EPG) data to STB 115. Network 135 may enable asset server 100 to retrieve content assets from asset DBs 105 and deliver those assets to devices (e.g., STB 115, mobile device 125 or computer 130) associated with user 145.

As depicted in FIG. 1, user 145 may send a search request 150 via a user device (e.g., mobile device 125 shown) to search engine 140 at asset server 100. Search engine 140 may determine a list of content assets that are relevant to one or more search parameters contained in search request 150. Asset server 100, using fan review-related information retrieved 160 from fan rating DBs 110, may sort the list of content assets using one of the exemplary sorting processes described herein and may provide the sorted list of content assets 155 to user 145. User 145, via the user device, may subsequently select one or more of the content assets from the sorted list of content assets 155 for delivery from asset server 100. For example, in an implementation in which the content assets comprise streaming TV or movie video, asset server 100 may stream a TV or movie video to user 145 that was selected from the sorted list of content assets by user 145.

The configuration of network components of network environment 100 illustrated in FIG. 1 is for illustrative purposes. Other configurations may be implemented. Therefore, network environment 100 may include additional, fewer and/or different components that may be configured in a different arrangement than those depicted in FIG. 1. For example, a single user 145, and user 145's associated devices (e.g., STB 115, mobile device 125, and computer 130) are depicted in FIG. 1. However, multiple different users, each with their own associated devices, may connect to network 135 for searching content assets at asset server 100, and for receiving content assets delivered from asset server 100.

Figure 2:
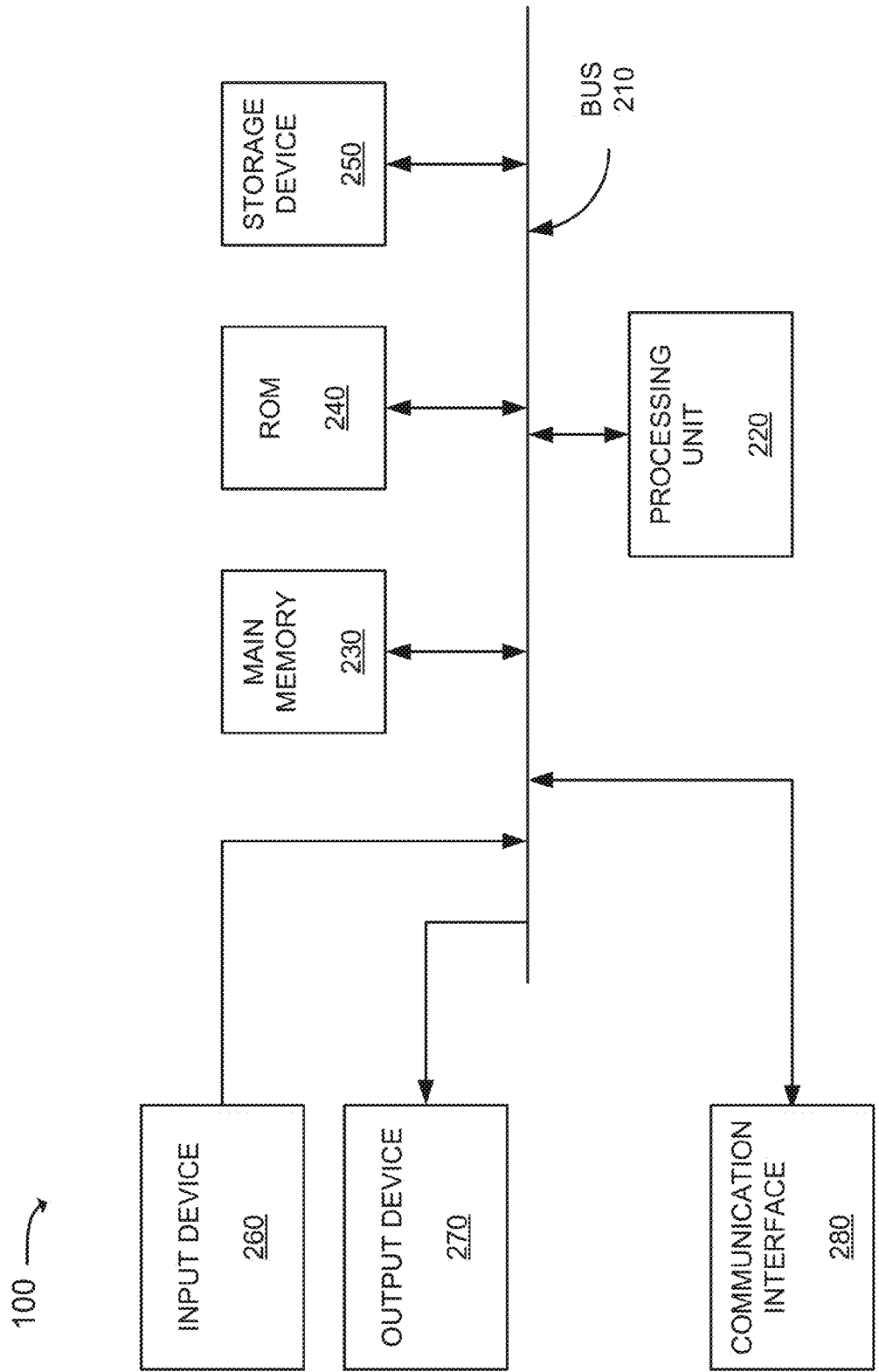
FIG. 2 is a diagram that depicts exemplary components of the asset server of FIG. 1.

FIG. 2 is a diagram that depicts exemplary components of asset server 100. Mobile device 125, computer 130, asset DBs 105 and fan rating DBs 110 may be similarly configured. Asset server 100 may include a bus 210, a processing unit 220, a main memory 230, a read only memory (ROM) 240, a storage device 250, an input device 260, an output device 270, and a communication interface 280. Bus 210 may include a path that permits communication among the components of asset server 100.

Processing unit 220 may include one or more processors or microprocessors, or processing logic, which may interpret and execute instructions. Main memory 230 may include a random access memory (RAM) or another type of dynamic storage device that may store information and instructions for execution by processing unit 220. ROM 240 may include a ROM device or another type of static storage device that may store static information and instructions for use by processing unit 220. Storage device 250 may include a magnetic and/or optical recording medium. Main memory 230, ROM 240 and storage device 250 may each be referred to herein as a "tangible non-transitory computer-readable medium."

Input device 260 may include one or more mechanisms that permit an operator to input information to asset server 100, such as, for example, a keypad or a keyboard, a display with a touch sensitive panel, voice recognition and/or biometric mechanisms, etc. Output device 270 may include one or more mechanisms that output information to the operator, including a display, a speaker, etc. Input device 260 and output device 270 may, in some implementations, be implemented as a user interface (UI) that displays UI information and which receives operator input via the UI. Communication interface 280 may include a transceiver that enables asset server 100 to communicate with other devices and/or systems. For example, communication interface 280 may include wired or wireless transceivers for communicating via network 135.

The configuration of components of asset server 100 shown in FIG. 2 is for illustrative purposes. Other configurations may be implemented. Therefore, asset server 100 may include additional, fewer and/or different components than those depicted in FIG. 3.

Figure 3:
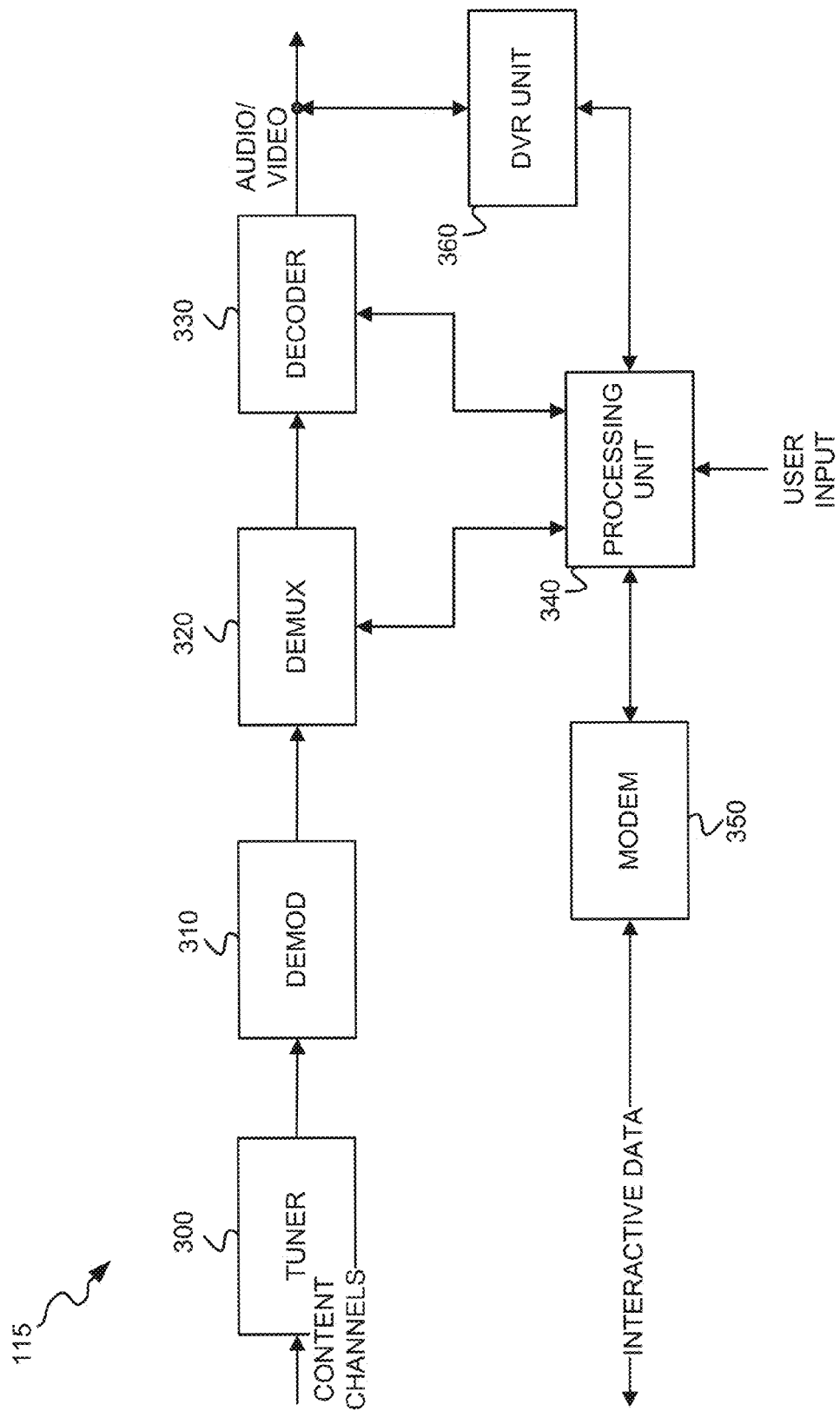
FIG. 3 is a diagram that depicts exemplary components of the set-top box of FIG. 1.

FIG. 3 depicts exemplary components of STB 115. STB 115 may include a tuner 300, a demodulator 310, a demultiplexer 320, a decoder 330, a processing unit 340, a modem 350, and a DVR unit 350. Tuner 300 may select and tune to specific broadcast television information by tuning to one of many different input channels. Each channel may be digitally modulated using, for example, quadrature amplitude modulation (QAM), though other types of modulation may be used. Demodulator 310 may demodulate the information in the channel selected by tuner 300 to produce a transport stream (e.g., MPEG-2 or MPEG-4 transport stream) containing the audio, video and/or other information related to the selected channel (e.g., a TV program).

Demultiplexer 320 may select and decrypt compressed audio and video from the transport stream for the particular TV program that the user wishes to watch. Decoder 330 may decode and decompress the decrypted audio and video information for the selected TV program. Processing unit 340 may include, for example, a microprocessor that controls the operations performed by tuner 300, demodulator 310, demultiplexer 320, decoder 330, modem 350 and DVR unit 360 based on user input (e.g., input received from the user via a remote control device). Modem 350 may send and receive interactive data (e.g., digital program guide information) that may be processed by processing unit 340. DVR unit 360 may digitally record, and store, audio and video content associated with the particular TV program decoded by decoder 330.

The configuration of components of STB 115 in FIG. 3 is for illustrative purposes only. Other configurations may be implemented. STB 115 may include additional, fewer and/or different components than those depicted in FIG. 3. For example, STB 115 may include memory storage that is not shown in FIG. 3.

Figure 4:
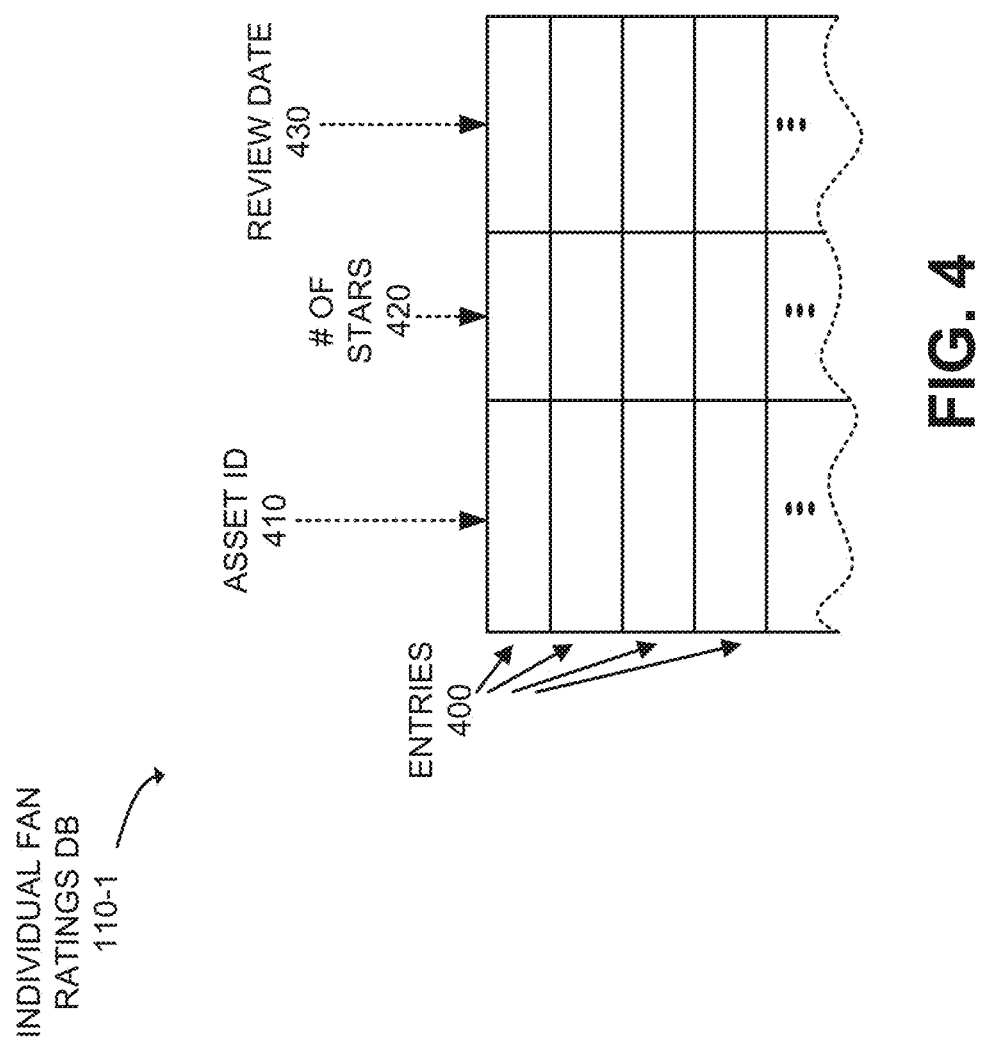
FIG. 4 is a diagram that depicts an exemplary individual fan ratings database.

FIG. 4 is a diagram that depicts an exemplary individual fan ratings DB 110-1. As shown, individual fan ratings DB 110-1 may include multiple entries 400, with each entry 400 including an asset identifier (ID) field 410, a number (#) of stars field 420, and a review date field 430. Each entry 400 of DB 110-1 may correspond to an individual fan rating of a content asset received from user 145.

Asset ID field 410 may store data that uniquely identifies a specific content asset of numerous different content assets. # of stars field 420 may store data that indicates how many stars are contained in the fan rating for a particular fan review of the specific content asset. For example, the stars may range from 1 star (lowest rating) to 5 stars (highest rating). A user may rate the content asset identified in asset ID field 410 by assigning a number of stars, and the number of stars are stored in field 420. Review date field 430 may store data that identifies a date or a date and time, at which the user assigned the number of stars fan rating indicated in field 420, and the fan rating and the review date are stored in fields 420 and 430, respectively for the content asset identified in field 410.

The number, types, and content of the entries and/or fields in individual fan ratings DB 110-1 in FIG. 4 are for illustrative purposes. Other types of data structures having different numbers of, types of and/or content of, the entries and/or the fields may be implemented. Therefore, DB 110-1 may include additional, fewer and/or different entries and/or fields than those depicted in FIG. 4.

Figure 5:
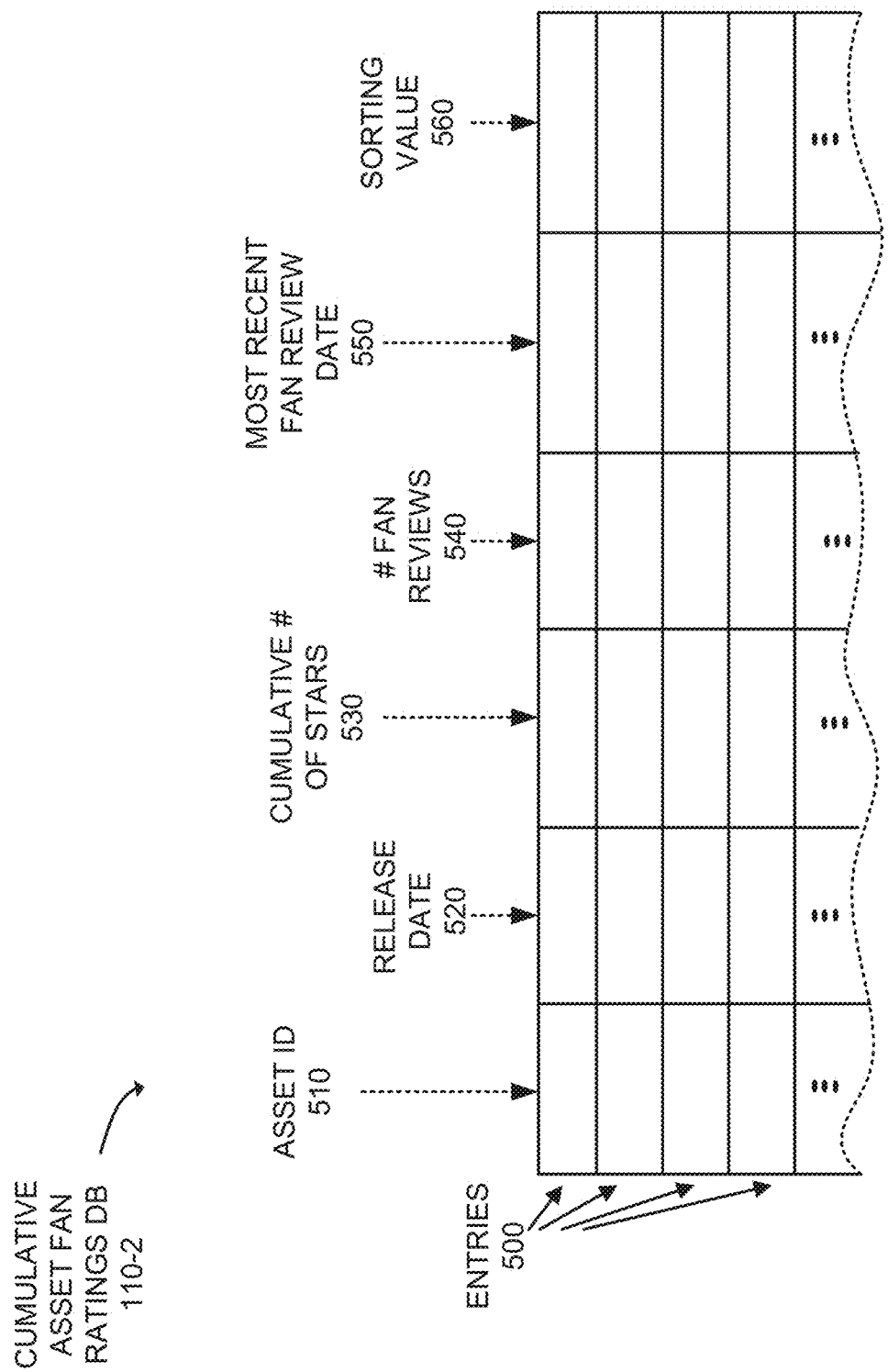
FIG. 5 is a diagram that depicts an exemplary cumulative asset fan ratings database.

FIG. 5 is a diagram that depicts an exemplary cumulative asset fan ratings DB 110-2. As shown, cumulative asset fan ratings DB 110-2 may include multiple entries 500, with each entry 500 including an asset identifier (ID) field 510, a release date field 520, a cumulative # of stars field 530, a # fan reviews field 540, a most recent fan review date field 550, and a sorting value field 560.

Asset ID field 510 may store data that uniquely identifies a specific content asset of numerous different content assets. Release date field 520 may store data that identifies a date at which the asset identified in field 510 was originally released (or otherwise first made available) to the public.

Cumulative # of stars field 530 may store data that indicates a number of stars averaged across all of the fan reviews for the asset identified in field 510. For a given content asset, all entries 400 of DB 110-1 may be identified having an asset ID that matches the given content asset. For each identified entry 400, the number stored in the # of stars field 420 may be retrieved, and all of the retrieved numbers of stars may be averaged together to generate an average number of stars for the content asset. This average number of stars may be stored in cumulative # of stars field 530 of DB 110-2.

fan reviews field 540 may store data that identifies the number of different fan reviews (e.g., reviews by different users). For a given content asset, all entries 400 of DB 110-1 may be identified having an asset ID that matches the given content asset. For each identified entry 400, a number of fan reviews counter value is incremented. After all of the identified entries 400 have been counted, the incremented counter value may be stored in # fan reviews field 540. Field 540, therefore, stores a total number of fan reviews that the content asset identified in field 510 has been given.

Most recent fan review date field 550 may store a date that indicates the most recent review date (i.e., most recent date a fan rating/review has been received from a user) associated with the content asset identified in field 410. For a given content asset, all entries 400 of DB 110-1 may be identified having an asset ID that matches the given content asset. The review dates stored in the review date field 430 of all of the identified entries 400 are compared to determine the most recent review date for the content asset. The determined most recent review date is stored in field 550 of DB 110-2.

Sorting value field 560 may store data that indicates a sorting value that has been determined by applying a function to fan rating/review information. For example, in one embodiment, the sorting value may be determined as a function of the number of stars, the number of reviews, and/or the release year for a content asset. In another embodiment, two or more different functions may be conditionally applied to fan rating/review information. In this embodiment, a first function may be applied to the fan rating/review information based upon the satisfaction of a first condition, and a second function may be applied to the fan rating/fan review information based upon the satisfaction of a second condition, and so on.

The number, types, and content of the entries and/or fields in cumulative asset fan ratings DB 110-2 in FIG. 5 are for illustrative purposes. Other data structures having different numbers of, types of and/or content of, the entries and/or the fields may be implemented. Therefore, DB 110-2 may include additional, fewer and/or different entries and/or fields than those depicted in FIG. 5.

Figure 6:
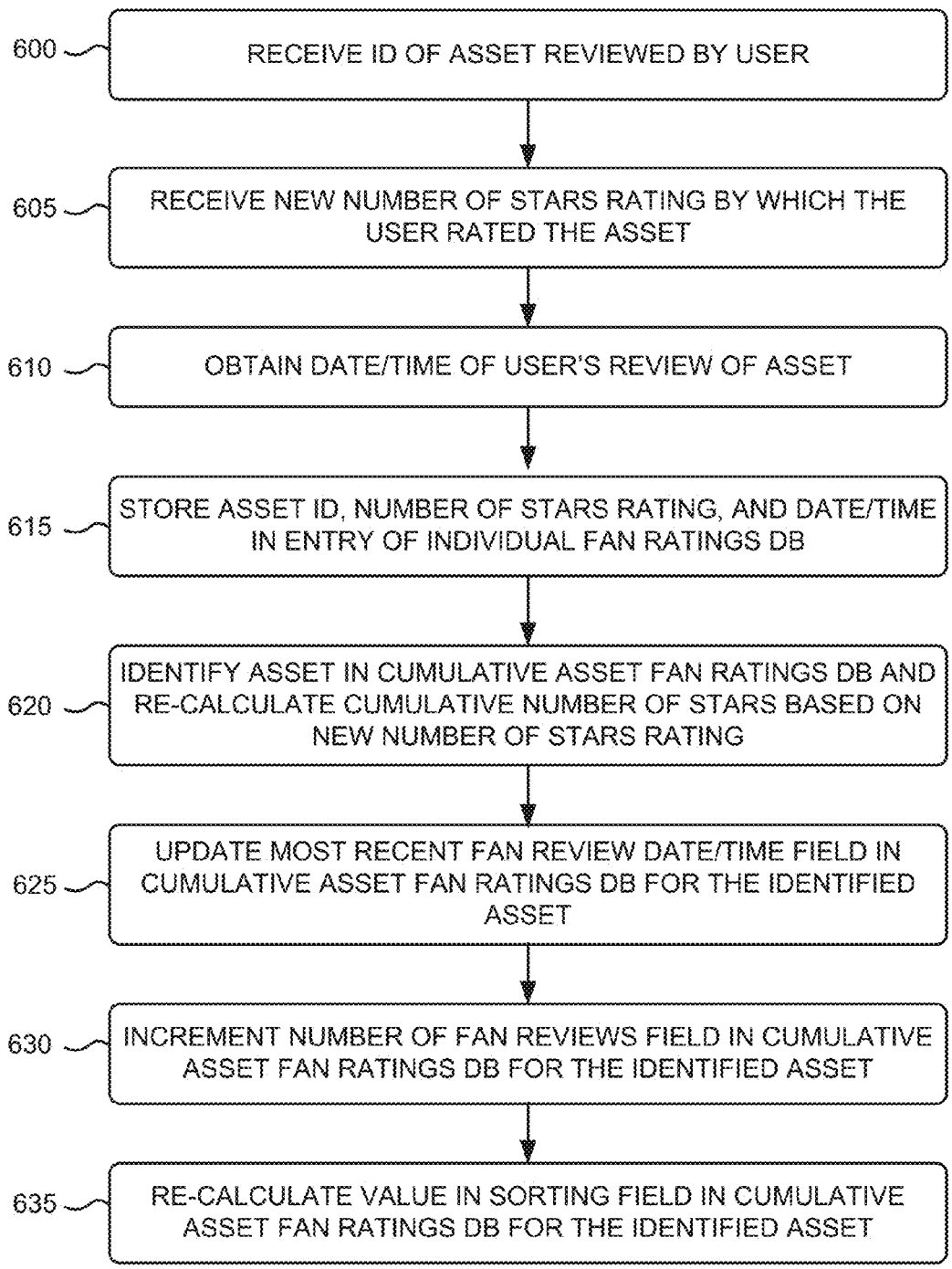
FIG. 6 is a flow diagram that illustrates an exemplary process for obtaining and storing a user's fan review/rating of a content asset in the individual fan rating database of FIG. 4, and updating the cumulative asset fan rating database of FIG. 5 based on the user's fan review/rating.

FIG. 6 is a flow diagram that illustrates an exemplary process for obtaining and storing a user's fan review/rating of a content asset in individual fan rating DB 110-1, and updating cumulative asset fan rating DB 110-2 based on the user's fan review/rating. The exemplary process of FIG. 6 may be implemented by asset server 100. The exemplary process of FIG. 6 is described below with reference to the messaging diagram of FIG. 7.

Figure 7:
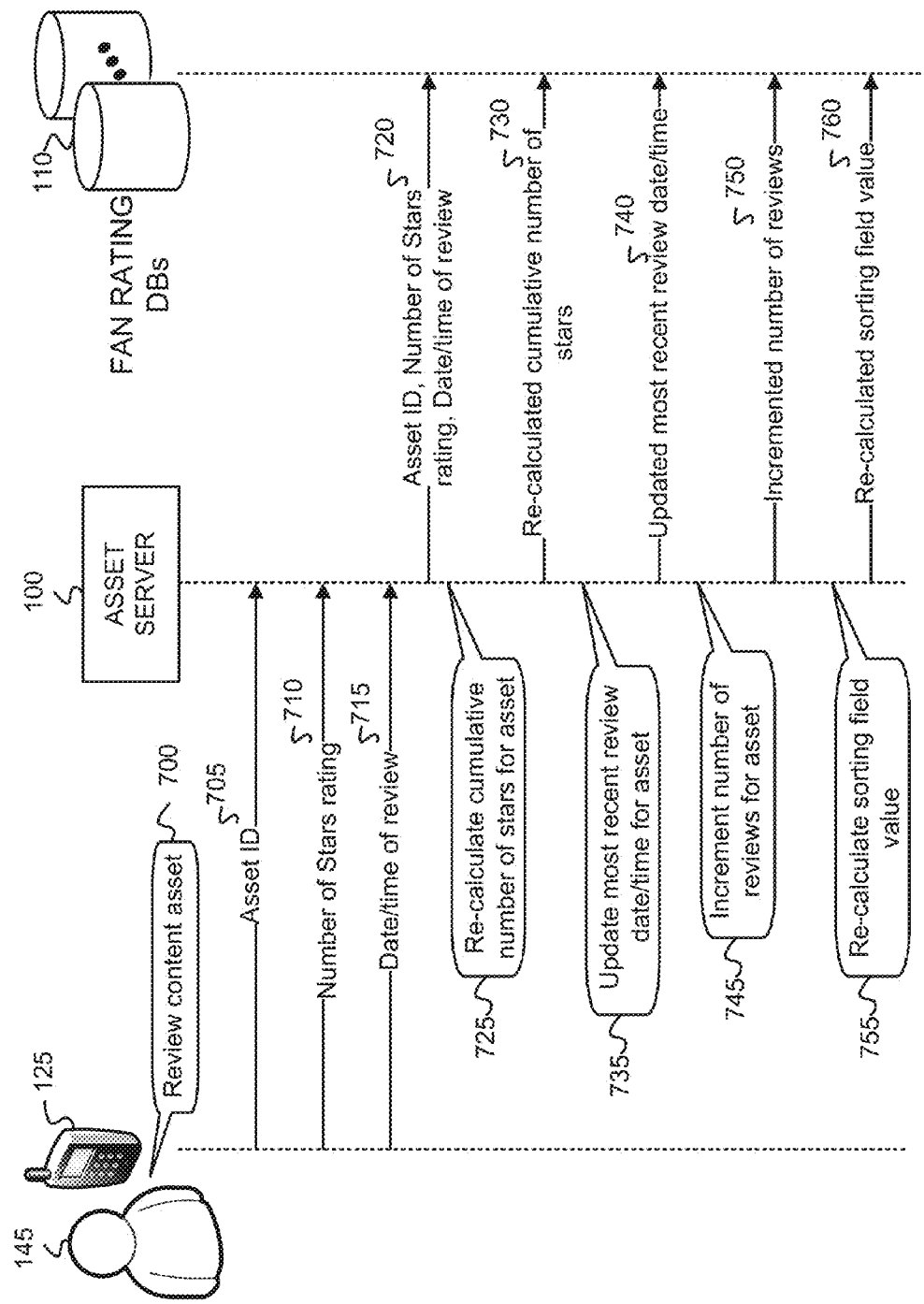
FIG. 7 is a diagram that depicts an exemplary messaging diagram associated with the exemplary process of FIG. 6.

The exemplary process may include asset server 100 receiving an ID of a content asset reviewed by a user (block 600), receiving a number of stars fan rating by which the user rated the content asset (block 605), and obtaining a date or date/time of the user's review of the content asset (block 610). As depicted in FIG. 7, user 145, via mobile device 125, may review 700 a content asset. The review of the content asset may include user 145 assigning a number of stars fan rating to the content asset. For example, user 145 may assign a number of stars within a range of 1 and 5, with 1 being a lowest fan rating and 5 being a highest fan rating. As shown in FIG. 7, mobile device 125 may send an asset ID 705, a number of stars rating 710, and a date or date/time 715 of the fan review by user 145 to asset server 100.

Asset server 100 may store the asset ID, the number of stars fan rating, and the date or date/time in an entry of individual fan ratings DB 110-1 (block 615). FIG. 7 depicts asset server 100 sending an asset ID, a number of stars rating, and a date/time of review 720 to fan ratings DB 110. Referring to FIG. 4, the received asset ID may be stored in field 410, the number of stars rating may be stored in field 420, and the review date or date/time may be stored in field 430 of an entry 400 of individual fan ratings DB 110-1.

Asset server 100 may identify the asset in cumulative asset fan ratings DB 110-2 and re-calculate the cumulative number of stars based on the new number of stars rating obtained in block 605 (block 620). Asset server 100 may obtain the previous cumulative number of stars contained in field 530 and may perform a calculation to determine a new average number of stars based on the new number of stars rating obtained in block 605. FIG. 7 depicts asset server 100 re-calculating 725 the cumulative number of stars for the asset, and sending the re-calculated cumulative number of stars 730 for storing in fan rating DBs 110.

Asset server 100 may update the "most recent fan review date" field 550 in the entry 500 of the cumulative asset fan ratings DB 110-2 for the identified asset (block 620). Asset server 100 may replace the current date or date/time in field 550 with the new review date from review date field 430 of the content asset. FIG. 7 depicts asset server 100 updating 735 the most recent review date/time for the asset, and sending the updated most recent review date/time 740 to fan rating DBs 110.

Asset server 100 may increment the "# of fan reviews" field 540 in the entry 500 of the cumulative asset fan ratings DB 110-2 for the identified asset (block 630). Asset server 100 may retrieve the previous number of fan reviews from field 540, increment the retrieved number of fan reviews, and the store the incremented number of fan reviews back in field 540. FIG. 7 depicts asset server 100 incrementing 745 the number of reviews for the asset, and sending the incremented number of reviews 750 to fan rating DBs 110 for storing in field 540 of DB 110-2.

Figure 8:
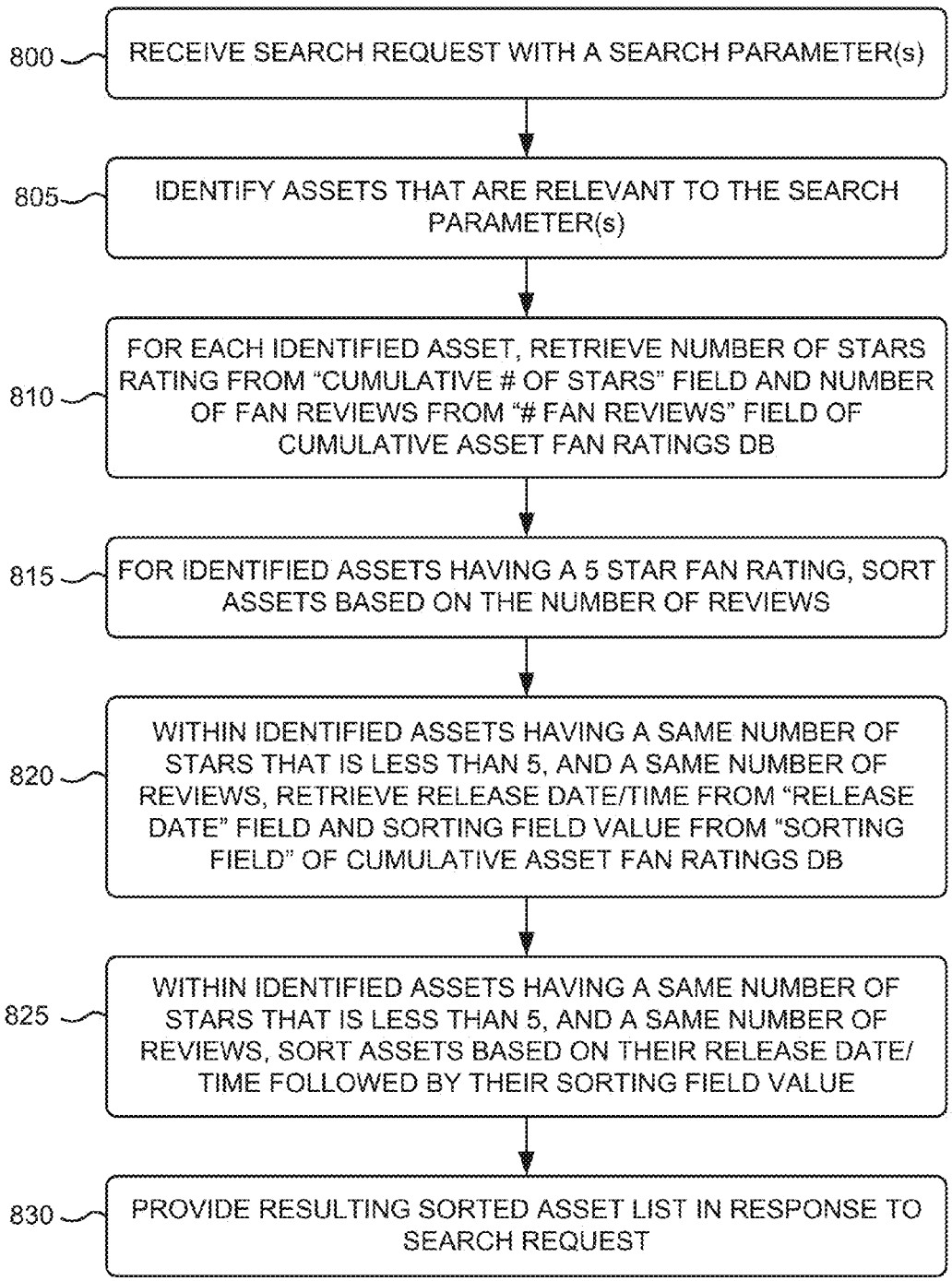
FIG. 8 is a flow diagram that illustrates a first exemplary process for searching a corpus of content assets, identifying assets that are relevant to a search query, and sorting the identified assets based on asset fan rating-related information.

Asset server 100 may re-calculate the value in the "sorting" field 560 in the entry 500 in the cumulative asset fan ratings DB 110-2 for the identified asset (block 635). Asset server 100 may determine the specific sorting process currently being used to determine a function to be used for calculating the sorting value. For example, the sorting processes of FIGS. 8, 10, and 12 may be used herein for sorting a list of content assets. If the exemplary process of FIG. 8 is being used to sort the list of content assets, then the sorting value for a given content asset may be determined as a function of the most recent fan review date, the number of fan reviews, the cumulative number of stars, and/or the release date for the content asset. The specific function may apply weighting values to one or more of the values for the most recent fan review date, the number of fan reviews, the cumulative number of stars, and/or the release date for the content asset. In one implementation, the sorting value may be determined using the following equation/function:

$$\text{sorting value} = \text{number of stars} * 10^6 + \text{number of reviews} * 10^5 + \text{release year} \qquad \text{Eqn. (1)}$$

The specific values for the weighting values $10^6$ and $10^5$ in Eqn. (1) may be altered/adjusted based on any given implementation. In alternatives to Eqn. (1), the most recent fan review date may also be included in Eqn. (1), along with an additional weighting value.

Figure 10:
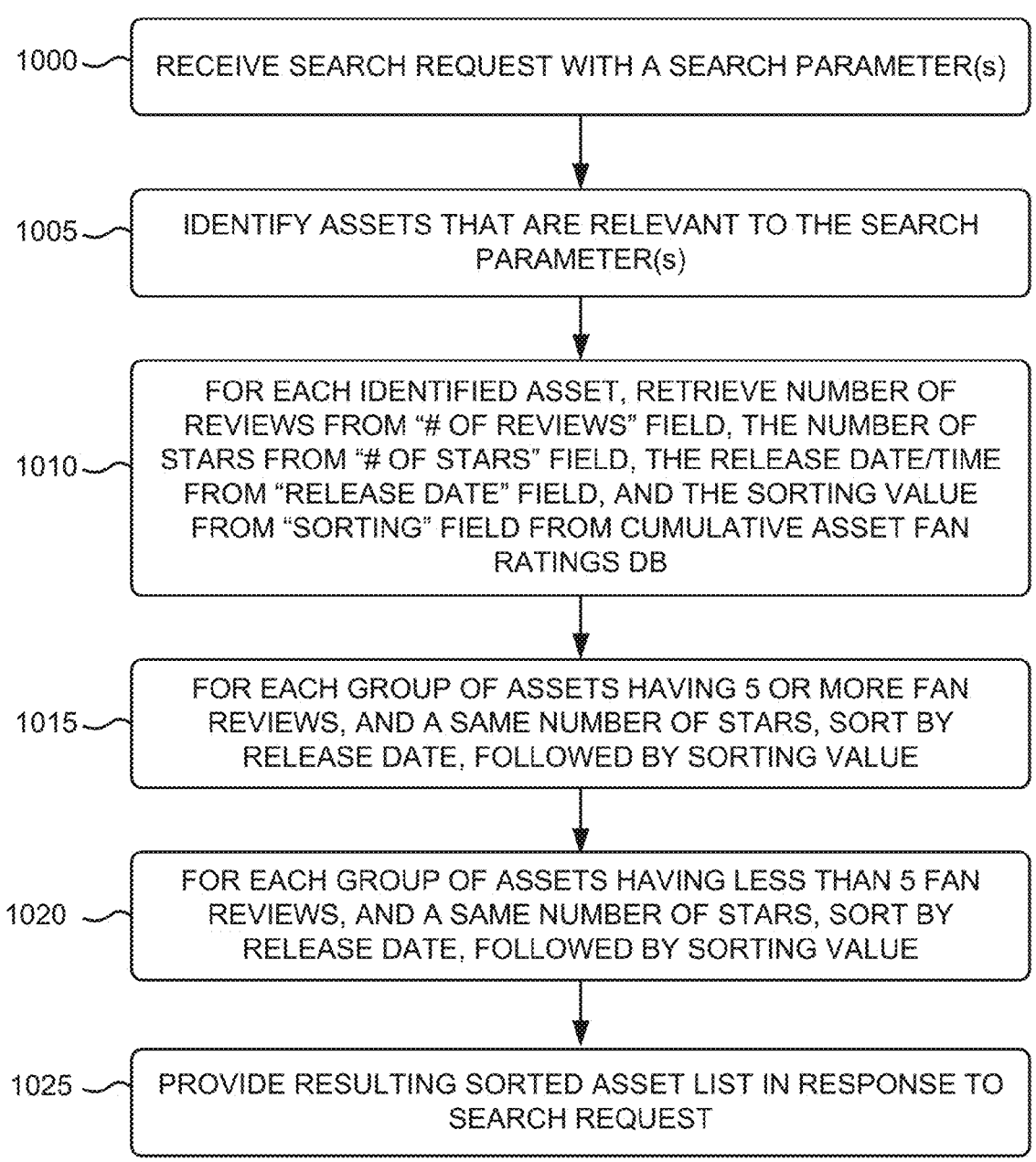
FIG. 10 is a flow diagram that illustrates a second exemplary process for searching a corpus of content assets, identifying assets that are relevant to a search query, and sorting the identified assets based on asset fan rating-related information.

If the exemplary process of FIG. 10 is being used to sort the list of content assets, then the sorting value for a given content asset may be conditionally determined based on a first function or based on a second function that is different than the first function. A conditional statement for applying a specific function may be conditional based on the value of most recent fan review date, the number of fan reviews, the cumulative number of stars, and/or the release date for the content asset. For example, a first conditional statement may include "if the most recent fan review is less than 3 days old, then . . . " The function contained in the "then" portion of the conditional statement may include a function of the most recent fan review date, the number of fan reviews, the cumulative number of stars, and/or the release date for the content asset, where the weighting values may be altered/adjusted (as compared to the weighting values used in Eqn. (1)) based on the specific implementation. Multiple different conditional statements and corresponding functions may be used to determine a sorting value for the exemplary process of FIG. 10. In one exemplary embodiment, the sorting value may be determined based on the following exemplary conditional statements and equations/functions:

if the number of reviews is $>=5$, then the sorting value=number of stars*$10^7$+number of reviews*$10^6$+release year; or if the number of reviews is $<5$, then the sorting value=number of stars*$10^6$+number of reviews*$10^5$+release year. $\qquad$ Eqn. (2)

Figure 12:
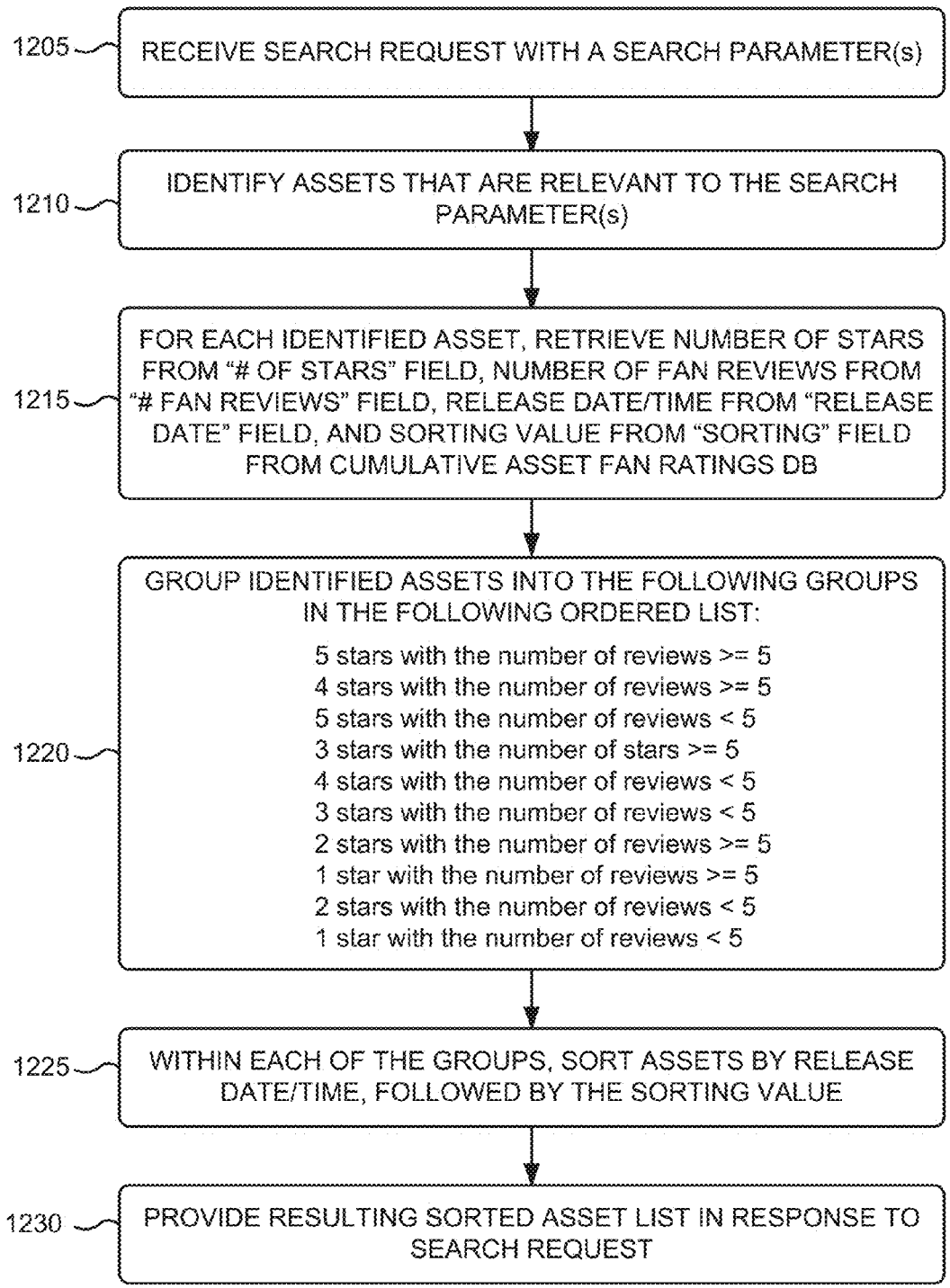
FIG. 12 is a flow diagram that illustrates a third exemplary process for searching a corpus of content assets, identifying assets that are relevant to a search query, and sorting the identified assets based on asset fan rating-related information.

If the exemplary process of FIG. 12 is being used to sort the list of content assets, then the sorting value for a given content asset may be conditionally determined based on multiple different functions. Multiple different conditional statements, functions and weighting values may be used as described above with respect to the exemplary process of FIG. 10. In one implementation, the sorting value may be determined based on the following exemplary conditional statements and equations/functions:

if the number of reviews is $>=4$ and the number of reviews$>=5$, then the sorting value=number of stars*$10^8$+number of reviews;

if the number of reviews is $=5$ and the number of reviews$<5$, then the sorting value=number of stars*$10^6$+number of reviews; or if the number of reviews is $=3$ and the number of reviews$>=5$, then the sorting value=number of stars*$10^5$+number of reviews. $\qquad$ Eqn. (3)

FIG. 8 is a flow diagram that illustrates a first exemplary process for searching a corpus of content assets, identifying assets that are relevant to a search query, and sorting the identified assets based on asset fan review/rating-related information. The exemplary process of FIG. 8 may be implemented by asset server 100. The exemplary process of FIG. 8 is described below with reference to the sorting example of FIGS. 9A and 9B. The exemplary process of FIG. 8 may employ the sorting values calculated by Eqn. (1), as already described above.

Figures 9A, 9B:
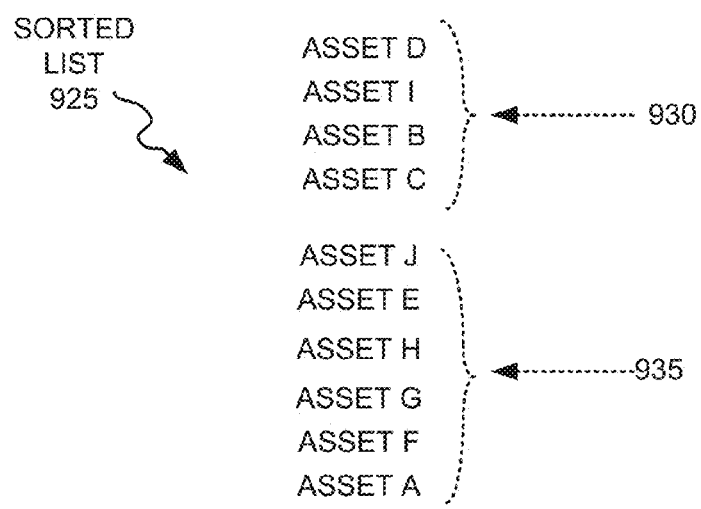
FIGS. 9A and 9B are diagrams that depict a sorting example associated with the exemplary process of FIG. 8.

The exemplary process may include search engine 140 at asset server 100 receiving a search request with a search parameter(s) (block 800). User 145 may initiate a search request, via STB 115, mobile device 125 or computer 130, which includes one or more search parameters. The search parameters may include, for example, keywords and, possibly, Boolean operators. Other types of search parameters may also be used (e.g., dates, date ranges, genre of content, etc.). Search engine 140 at asset server 100 may identify assets that are relevant to the search parameter(s) (block 805). Search engine 140 may use one or more search algorithms to search a corpus of content assets to identify content assets that are relevant to the search parameters contained in the search request. For example, if the search request includes a keyword, then search engine 140 can search the corpus of content assets to identify those assets having associated data that match the keyword. The corpus of documents may be stored, for example, in asset DBs 105. FIG. 9A depicts an example of an unsorted list 900 of content assets that search engine 140 has identified as being relevant to search parameters contained in a search request.

Asset server 100 may, for each identified asset, retrieve, from cumulative asset fan ratings DB 110-2, a number of stars fan rating from the "cumulative # of stars" field 530, and a number of fan reviews from the "# fan reviews" field 540 (block 810). In the example unsorted list 900 of FIG. 9A, the retrieved number of stars 905 and the number of fan reviews for each asset in list 900 are depicted. Asset server 100 may, for identified assets having a five star fan rating, sort the assets based on the number of fan reviews (block 815). Referring to list 900, assets B, C, D and I have 5 star fan ratings and a number of reviews of 10, 3, 20 and 15, respectively. Therefore, as depicted in sorted list 925 of FIG. 9B, the assets have 5 star fan ratings are sorted as the first 4 assets 930 in list 925 in the order: D, I, B, C in decreasing number of reviews 20, 15, 10, 3.

Asset server 100 may, within identified assets having a same number of stars that is less than five, and a same number of fan reviews, retrieve a release date or date/time from the "release date" field 520 and the sorting value from "sorting" field 560 of cumulative asset fan ratings DB 110-2 (block 820). Referring to unsorted list 900 of FIG. 9A, assets A, E, F, G, H and J have a same number of 4 stars (i.e., less than 5). Among these assets, assets H and E both have 15 reviews, and assets F and A both have 5 reviews. Asset G has 10 reviews and asset J has 20 reviews. Therefore, as shown in FIG. 9B, asset J, having 20 reviews, is listed first in group 935. Assets E and H, having 4 stars and 15 reviews, are listed second and third in group 935. Asset G, having 4 stars and 10 reviews, is listed fourth in group 935. Assets A and F, having 4 stars and 5 reviews, are listed fifth and sixth in group 935.

Asset server 100 may, within identified assets having a same number of stars that is less than five, and a same number of fan reviews, sort the assets based on their release date/time, followed by sorting by the sorting field value (block 825). From block 820, assets H and E both have 4 stars and 15 reviews. Asset H has a release date of 1975 and asset E has a release date of 1985. Therefore, in group 935, asset E is listed before asset H. Further, from block 820, assets F and A both have 4 stars and 5 reviews. Asset F has a release date of 2013 and asset A has a release date of 1999. Therefore, in group 935, asset F is listed before asset A. Since the assets have different release dates in the example sorted list 925 of FIG. 9B, there is no need to rely on the sorting values for each asset.

Asset server 100 may provide the resulting sorted asset list in response to the search request (block 830). As shown in the example of FIG. 9B, the resulting sorted list 1125 would include assets sorted into the following order: D, I, B, C, J, E, H, G, F, A. Asset server 100 may send a message with the sorted asset list (e.g., sorted list 925 of FIG. 9B) to user 145. The sorted asset list may include, for example, hyperlinks for each of the content assets in the sorted list, such that selection of a respective hyperlink by user 145 causes the corresponding content asset to be requested from asset server 100.

FIG. 10 is a flow diagram that illustrates a second exemplary process for searching a corpus of content assets, identifying assets that are relevant to a search query, and sorting the identified assets based on asset fan rating-related information. The exemplary process of FIG. 10 may be implemented by asset server 100. The exemplary process of FIG. 10 is described below with reference to the sorting example of FIGS. 11A and 11B. The exemplary process of FIG. 10 may employ the sorting values calculated by Eqn. (2), as already described above.

The exemplary process may include asset server 100 receiving a search request with a search parameter(s) (block 1000). User 145 may initiate a search request, via STB 115, mobile device 125 or computer 130, which includes one or more search parameters. The search parameters may include, for example, keywords and, possibly, Boolean operators. Other types of search parameters may also be used (e.g., dates, date ranges, genre of content, etc.).

Figures 11A, 11B:
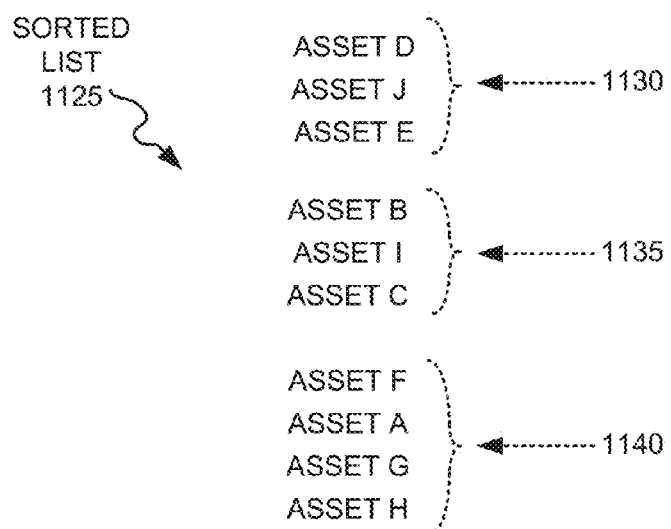
FIGS. 11A and 11B are diagrams that depict a sorting example associated with the exemplary process of FIG. 10.

Asset server 100 may identify assets that are relevant to the search parameter(s) (block 1005). Search engine 140 may use one or more search algorithms to search a corpus of content assets to identify content assets that are relevant to the search parameters contained in the search request. For example, if the search request includes a keyword, then search engine 140 can search the corpus of content assets to identify those assets having associated data that match the keyword. The corpus of documents may be stored, for example, in asset DBs 105. FIG. 11A depicts an example of an unsorted list 1100 of content assets that search engine 140 has identified as being relevant to search parameters contained in a search request.

Asset server 100 may, for each identified asset, retrieve a number of reviews from the "# of fan reviews" field 540, the number of stars from the "# of stars" field 530, the release date or date/time from the "release date" field 520, and the sorting value from the "sorting" value field 560 from the cumulative asset fan ratings DB 110-2 (block 1010). In the example unsorted list 1100 of FIG. 9A, the retrieved number of fan reviews 1110, the number of stars 1105, the release date 1115, and the sorting value 1120 for each asset in list 1100 are depicted.

Asset server 100 may, for each group of assets having five or more fan reviews, and a same number of stars, sort by release date, followed by sorting by the sorting value (block 1015). As can be seen in the unsorted list 1100 of FIG. 11A, assets D, E, and J have 5 or more fan reviews, with asset D having 5 stars, and assets E and J each having 4 stars. Therefore, asset D, with 5 or more fan reviews and 5 stars would be, as depicted in FIG. 11B, sorted first in group 1130 of sorted list 1125. Then, asset E, having a release date of 1985 would be sorted after asset J, having a release date of 2011. Thus, the sorted group 1130 of sorted list 1125 would include assets D, E, and J sorted in the order D, J, E (first to last).

Asset server 100 may, for each group of assets having less than five fan reviews, and a same number of stars, sort by the release date or date/time, followed by sorting by the sorting value (block 1020). The sorting value would already have been calculated using the two conditionally applied functions described above. In the example of FIGS. 11A and 11B, assets I, B, and C, having less than five fan reviews and five stars each, would be sorted in a group 1135 after group 1130. As can be seen in FIG. 11B, asset B, having a release date of 2013, would be sorted first before asset I, having a release date of 2012, and asset C, having a release date of 2010. Asset I would, in turn, be sorted before asset C in group 1135, where group is sorted after group 1130. Assets F, A, G and H, with each having less than 5 fan reviews and 4 stars would be sorted together in a group 1140 after group 1135. With asset F having a release date of 2013, and asset A having a release date of 1999, asset F would be sorted first before asset A. Assets G and H, both having release dates of 1975 and a sorting value of 4,201,975, would be sorted third and fourth after assets F and A in group 1140.

Asset server 100 may provide the resulting sorted asset list in response to the search request (block 1025). As shown in the example of FIG. 11B, the resulting sorted list 1125 would include assets sorted into the following order: D, J, E, B, I, C, F, A, G, H. Asset server 100 may send a message with the sorted asset list (e.g., sorted list 1125 of FIG. 11B) to user 145. The sorted asset list may include, for example, hyperlinks for each of the content assets in the sorted list, such that selection of a respective hyperlink by user 145 causes the corresponding content asset to be requested from asset server 100.

FIG. 12 is a flow diagram that illustrates a third exemplary process for searching a corpus of content assets, identifying assets that are relevant to a search query, and sorting the identified assets based on asset fan rating-related information. The exemplary process of FIG. 12 may be implemented by asset server 100. The exemplary process of FIG. 12 is described below with reference to the sorting example of FIGS. 13A and 13B. The exemplary process of FIG. 12 may employ the sorting values calculated by Eqn. (3), as already described above.

The exemplary process may include asset server 100 receiving a search request with a search parameter(s) (block 1205). User 145 may initiate a search request, via STB 115, mobile device 125 or computer 130, which includes one or more search parameters. The search parameters may include, for example, keywords and, possibly, Boolean operators. Other types of search parameters may also be used (e.g., dates, date ranges, genre of content, etc.).

Figures 13A, 13B:
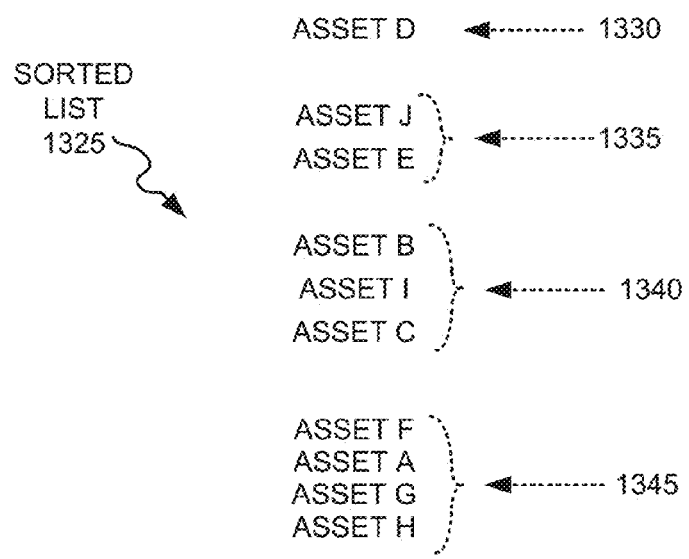
FIGS. 13A and 13B are diagrams that depict a sorting example associated with the exemplary process of FIG. 12.

Asset server 100 may identify assets that are relevant to the search parameter(s) (block 1210). Search engine 140 may use one or more search algorithms to search a corpus of content assets to identify content assets that are relevant to the search parameters contained in the search request. For example, if the search request includes a keyword, then search engine 140 can search the corpus of content assets to identify those assets having associated data that match the keyword. The corpus of documents may be stored, for example, in asset DBs 105. FIG. 13A depicts an example of an unsorted list 1300 of content assets that search engine 140 has identified as being relevant to search parameters contained in a search request.

Asset server 100 may, for each identified asset, retrieve a number of stars fan rating from the "cumulative # of stars" field 530, a number of fan reviews from the "# fan reviews" field 540, a release date or data/time from the "release date" field 520, and a sorting value from the "sorting" value field 560 from the cumulative asset fan ratings DB 110-2 (block 1215). In the example unsorted list 1300 of FIG. 13A, the retrieved number of stars 1305, the number of fan reviews 1310, the release date 1315, and the sorting value 1320 for each asset in list 1300 are depicted.

Asset server 100 may group the identified assets in the following groups in the following ordered list (block 1220):

5 stars with the number of reviews>=5
4 stars with the number of reviews>=5
5 stars with the number of reviews<5
3 stars with the number of reviews>=5
4 stars with the number of reviews<5
3 stars with the number of reviews<5
2 stars with the number of reviews>=5
1 star with the number of reviews>=5
2 stars with the number of reviews<5
1 star with the number of reviews<5

As depicted in the sorting example of FIG. 13B, asset D, having five stars and a number of fan reviews of 5, is sorted in a first group 1330. Assets E and J, each having 4 stars and greater than five fan reviews, are sorted into a second group 1335 after first group 1330. Assets B, I and C, each having five stars and less than five fan reviews, are sorted in to a third group 1340 after second group 1335. Assets F, A, G and H, each having four stars and less than 5 fan reviews, are sorted into a fourth group 1345.

Within each of the groups of block 1220, asset server 100 may sort the assets by the release date or date/time, followed by sorting by the sorting value (block 1225). As shown in the sorting example of FIG. 13B, in group 1335, since asset E has a release date of 1985 and asset J has a release date of 2011, asset J is sorted before asset E in group 1335. In group 1340, since asset B has a release date of 2013, asset I has a release date of 2012, and asset C has a release date of 2010, the assets are sorted in the order: B, I, C. In group 1345, since assets F, A, G and H have respective release dates of 2013, 1999, 1975 and 1975, the assets are sorting within group 1345 in the order: F, A, G, H.

Asset server 100 may provide the resulting sorted list in response to the search request (block 1230). As shown in the example of FIG. 13B, the resulting sorted list 1125 would include assets sorted into the following order: D, J, E, B, I, C, F, A, G, H. Asset server 100 may send a message with the sorted asset list (e.g., sorted list 1325 of FIG. 13B) to user 145. The sorted asset list may include, for example, hyperlinks for each of the content assets in the sorted list, such that selection of a respective hyperlink by user 145 causes the corresponding content asset to be requested from asset server 100.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 6, 8, 10, and 12, the order of the blocks may be varied in other implementations. Various processes for sorting lists of content assets have been described herein that use a calculated sorting value for sorting content assets among one another, in addition to other criteria for sorting content assets among one another. In some implementations, the calculated sorting value may be used for sorting the list of content assets, either by itself, or in conjunction with only one other fan review/comment value. For example, a sorting process may sort content assets first by "cumulative number of stars" and then by sorting value within the content assets having the same number of stars. The function/equation used to calculate the sorting value may be based on weighting values, and the most recent fan review date, the number of fan reviews, the cumulative number of stars, and/or the release date for the content asset (e.g., as described above with respect to Eqn. (1)). The specific function may apply weighting values to one or more of the values for the most recent fan review date, the number of fan reviews, the cumulative number of stars, and/or the release date for the content asset. The weighting values may be selected for the particular sorting application.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a device, a search request, that includes one or more search parameters, for searching a corpus of assets comprising items of digital content stored in one or more asset databases;
    identifying, by the device using a search engine, a list of assets, from the corpus of assets stored in the one or more asset databases, that are relevant to the one or more search parameters, wherein the list of assets comprises a first asset and other assets;
    obtaining, by the device from one or more fan rating databases, a first number of stars associated with fan ratings of the first asset, wherein the first asset comprises a first item of digital content;
    obtaining, by the device from the one or more fan rating databases, a total first number of fan reviews of the first asset, wherein the total first number of fan reviews of the first asset comprises a total number of times that the first asset has been reviewed by a plurality of users over a period of time;
    obtaining, by the device from the one or more fan rating databases, a first release year associated with the first asset;
    determining, by the device, a first sorting value based on a function of the first number of stars, the total first number of fan reviews, and the first release year, wherein the function determines the first sorting value by multiplying the first number of stars by a first constant, adding the total first number of fan reviews multiplied by a second constant, and adding the first release year;
    sorting, by the device, the first asset among the other assets using the determined first sorting value to create a sorted asset list;
    providing the sorted asset list to be displayed, in response to the search request;
    receiving, at the device, an indication of a selected asset from the sorted asset list; and
    generating and transmitting, by the device, an asset transport stream based on the selected asset.

2. The method of claim 1, wherein the first number of stars comprises a quantity of stars between one and five, wherein each additional star between the one and five stars represents a higher fan rating of the first asset.

3. The method of claim 1, wherein the function determines the sorting value using the following relation:

$$\text{first sorting value} = \text{first number of stars} * WC_1 + \text{total first number of fan reviews} * WC_2 + \text{first release year},$$

wherein $WC_1$ comprises the first constant and wherein $WC_2$ comprises the second constant.

4. The method of claim 3, wherein the first constant $WC_1$ equals $10^6$ and wherein the second constant $WC_2$ equals $10^5$.

5. The method of claim 1, wherein the function comprises a first function or a second function and further comprising:
    selecting either the first function or the second function based on the total first number of fan reviews.

6. The method of claim 5, wherein selecting either the first function or the second function comprises:

if the total first number of fan reviews is greater than or equal to five, then the first sorting value = first number of stars*$10^7$+total first number of fan reviews*$10^6$+first release year, or if the total first number of fan reviews is less than five, then the first sorting value = first number of stars*$10^6$+total first number of fan reviews*$10^5$+first release year.

7. The method of claim 1, wherein the list of assets further comprises a second asset, and further comprising:
    obtaining a second number of stars associated with fan ratings of the second asset, wherein the second asset comprises a second item of digital content;
    obtaining a total second number of fan reviews of the second asset, wherein the total second number of fan reviews of the second asset comprises a total number of times that the second asset has been reviewed by the plurality of users;
    obtaining a second release year associated with the second asset;
    determining a second sorting value based on a function of the second number of stars, the total second number of fan reviews, and the second release year; and
    sorting the second asset among the other assets using the determined second sorting value.

8. The method of claim 1, wherein the function comprises a first function, a second function, or a third function and further comprising:
    selecting either the first function, the second function or the third function based on the total first number of fan reviews and the first number of stars.

9. The method of claim 8, wherein selecting either the first function, the second function, or the third function comprises:

if the first number of stars is >=4 and the total first number of fan reviews is greater than or equal to five, then the first sorting value=first number of stars*$10^8$+total first number of fan reviews, if the first number of stars is =5 and the total first number of fan reviews is <than five, then the first sorting value=first number of stars*$10^6$+total first number of fan reviews, or if the first number of stars is =3 and the total first number of fan reviews is >=5, then the first sorting value=first number of stars*$10^5$+total first number of fan reviews.

10. A device, comprising:
a communication interface configured to connect to a network, and to:
  receive a search request, that includes one or more search parameters, for searching a corpus of assets comprising items of digital content stored in one or more asset databases; and
a processing unit configured to implement a search engine and to:
  identify, using the search engine, a list of assets, from the corpus of assets stored in the one or more asset databases, that are relevant to the one or more search parameters, wherein the list of assets comprises a first asset and other assets,
  obtain, from one or more fan rating databases via the communication interface, a first number of stars associated with fan ratings of a first asset, wherein the first asset comprises a first item of digital content,
  obtain, from the one or more fan rating databases via the communication interface, a total first number of fan reviews of the first asset, wherein the total first number of fan reviews of the first asset comprises a total number of times that the first asset has been reviewed by a plurality of users over a period of time,
  obtain, from the one or more fan rating databases via the communication interface, a first release year associated with the first asset,
  determine a first sorting value based on a function of the first number of stars, the total first number of reviews, and the first release year, wherein the function determines the first sorting value by multiplying the first number of stars by a first constant, adding the total first number of fan reviews multiplied by a second constant, and adding the first release year,
  sort the first asset among the other assets using the determined first sorting value to create a sorted asset list,
  provide, via the communication interface, the sorted asset list to be displayed in response to the search request,
  receive, via the communication interface, an indication of a selected asset from the sorted asset list, and
  generate and transmit, via the communication interface, an asset transport stream based on the selected asset.

11. The device of claim 10, wherein the first number of stars comprises a quantity of stars between one and five, wherein each additional star between the one and five stars represents a higher fan rating of the first asset.

12. The device of claim 10, wherein the function determines the first sorting value using the following relation:

first sorting value=first number of stars*$WC_1$+total first number of fan reviews*$WC_2$+first release year, wherein $WC_1$ comprises the first constant and wherein $WC_2$ comprises the second constant.

13. The network device of claim 12, wherein the first constant $WC_1$ equals $10^6$ and wherein the second constant $WC_2$ equals $10^5$.

14. The device of claim 10, wherein the function comprises a first function or a second function and wherein the processing unit is further configured to:
  select either the first function or the second function based on the total first number of fan reviews.

15. The device of claim 14, wherein when selecting either the first function or the second function, the processing unit is further configured to:

if the total first number of fan reviews is greater than or equal to five, then the first sorting value=first number of stars*$10^7$+total first number of fan reviews*$10^6$+first release year, or if the total first number of fan reviews is less than five, then the first sorting value=first number of stars*$10^6$+total first number of fan reviews*$10^5$+first release year.

16. The device of claim 10, wherein the list of assets further comprises a second asset, and wherein the processing unit is further configured to:
  obtain a second number of stars associated with fan ratings of the second asset, wherein the second asset comprises a second item of digital content;
  obtain a total second number of fan reviews of the second asset, wherein the total second number of fan reviews of the second asset comprises a total number of times that the second asset has been reviewed by the plurality of users;
  obtain a second release year associated with the second asset;
  determine a second sorting value based on a function of the second number of stars, the total second number of fan reviews, and the second release year; and
  sort the second asset among the other assets using the determined second sorting value.

17. The device of claim 10, wherein the function comprises a first function, a second function, or a third function and wherein the processing unit is further configured to:
  select either the first function, the second function or the third function based on the total first number of fan reviews and the first number of stars.

18. The device of claim 17, wherein when selecting either the first function, the second function, or the third function, the processing unit is further configured to:

if the first number of stars is >=4 and the total first number of fan reviews is greater than or equal to five, then the first sorting value=first number of stars*$10^8$+total first number of fan reviews, if the first number of stars is =5 and the total first number of fan reviews is <than five, then the first sorting value=first number of stars*$10^6$+total first number of fan reviews, or if the first number of stars is =3 and the total first number of fan reviews is >=5, then the first sorting value=first number of stars*$10^5$+total first number of fan reviews.

19. A non-transitory computer-readable medium containing instructions executable by at least one processing unit of a device, the computer-readable medium comprising one or more instructions for:
  receiving, by the device, a search request, that includes one or more search parameters, for searching a corpus of assets comprising items of digital content stored in one or more asset databases;

identifying, using a search engine, a list of assets, from the corpus of assets stored in the one or more asset databases, that are relevant to the one or more search parameters, wherein the list of assets comprises a first asset and other assets;

obtaining, from one or more fan rating databases, a first number of stars associated with fan ratings of a first asset, wherein the first asset comprises a first item of image, video or audio digital content and wherein the first number of stars comprises an average of a number of stars applied by a group of reviewing users over a first period of time;

obtaining, from the one or more fan rating databases, a total first number of fan reviews of the first asset, wherein the total first number of fan reviews comprise a sum total of reviews by the group of reviewing users over a second period of time;

obtaining, from the one or more fan rating databases, a first release year associated with the first asset;

determining a first sorting value based on a mathematical function applied to the first number of stars, the total first number of fan reviews, and the first release year, wherein the mathematical function determines the first sorting value by multiplying the first number of stars by a first constant, adding the total first number of fan reviews multiplied by a second constant, and adding the first release year;

sorting the first asset among the other assets using the determined first sorting value to produce a sorted asset list;

causing the sorted asset list to be sent to be displayed in response to the search request;

receiving, at the device, an indication of a selected asset from the sorted asset list; and generating and transmitting, by the device, an asset transport stream based on the selected asset.

20. The non-transitory computer-readable medium of claim 19, wherein the mathematical function determines the first sorting value using the following relation:

first sorting value=first number of stars*$WC_1$+total first number of fan reviews*$WC_2$+first release year, wherein $WC_1$ comprises the first constant and wherein $WC_2$ comprises the second constant.

21. The non-transitory computer-readable medium of claim 19, wherein the list of assets further comprises a second asset, and the computer-readable medium further comprising one or more instructions for:

obtaining a second number of stars associated with fan ratings of the second asset, wherein the second asset comprises a second item of image, video or audio digital content and wherein the second number of stars comprises an average of a number of stars applied by the group of reviewing users;

obtaining a total second number of fan reviews of the second asset, wherein the total second number of fan reviews of the second asset comprises a sum total of reviews by the group of reviewing users over the period of time;

obtaining a second release year associated with the second asset;

determining a second sorting value based on the mathematical function applied to the second number of stars, the total second number of fan reviews, and the second release year; and sorting the second asset among the other assets using the determined second sorting value to produce the list of sorted assets.

22. The non-transitory computer-readable medium of claim 19, wherein the mathematical function comprises a first function or a second function and the computer-readable medium further comprising one or more instructions for:

selecting either the first function or the second function based on the total first number of fan reviews, wherein selecting either the first function or the second function comprises:

if the total first number of fan reviews is greater than or equal to five, then the first sorting value=first number of stars*$10^7$+total first number of fan reviews*$10^6$+first release year, or if the total first number of fan reviews is less than five, then the first sorting value=first number of stars*$10^6$+total first number of fan reviews*$10^5$+first release year.

23. The non-transitory computer-readable medium of claim 19, wherein the function comprises a first function, a second function, or a third function and the one or more computer-readable medium further comprising one or more instructions for:

selecting either the first function, the second function or the third function based on the total first number of fan reviews and the first number of stars, wherein selecting either the first function, the second function, or the third function comprises:

if the first number of stars is >=4 and the total first number of fan reviews is greater than or equal to five, then the first sorting value=first number of stars*$10^8$+total first number of fan reviews, if the first number of stars is =5 and the total first number of fan reviews is <than five, then the first sorting value=first number of stars*$10^6$+ total first number of fan reviews, or if the first number of stars is =3 and the total first number of fan reviews is >=5, then the first sorting value=first number of stars*$10^5$+total first number of fan reviews.

* * * * *